United States Patent Office 3,708,533
Patented Jan. 2, 1973

3,708,533
METHOD FOR THE PREPARATION OF AMINO-
CARBOXYLIC ACID SALTS
Ibrahim S. Bechara, New Castle, George B. De La Mater, Media, and Barton Milligan, Ardmore, Pa., assignors to Air Products and Chemicals Inc., Philadelphia, Pa.
No Drawing. Filed Jan. 25, 1971, Ser. No. 109,642
Int. Cl. C07c 51/30, 10/04
U.S. Cl. 260—531 C   6 Claims

ABSTRACT OF THE DISCLOSURE

Production of the salts of aminocarboxylic acids from amino alkanols and alkali metal hydroxides in the presence of catalyst is substantially improved in obtaining high yields at shortened reaction times when the reaction is effected in the presence of higher water concentrations and substantially lower hydrogen partial pressure conditions. Particularly advantageous results are obtained with the trisodium salt of nitrilo triacetic acid prepared from nitrilotriethanol and aqueous caustic.

BACKGROUND OF THE INVENTION

(1) Field of the invention

This invention pertains to improved methods of producing the alkali metal salts of amino carboxylic acids derived from amino alkanols and is particularly directed to the preparation of the alkali metal salts of tertiary amino carboxylic acids derived from tertiary amino alkanols.

(2) Prior art

The synthesis of alkali metal salts of amino carboxylic acids by reaction of amino alkanols and alkali metal hydroxides in a catalyzed aqueous system has been known in the art with the general reaction having been disclosed by Dumas and Stas (Ann, 35, 129–173, 1840). Subsequent developments have given particular attention to the conversion of amino alcohols to the alkali metal salts under carefully controlled conditions such that the amino groups are generally maintained intact permitting more favorable conversion to the alkali metal carboxylic acid salt. Typical of the state of the art are U.S. Pats. 2,384,816; 2,384,817; 2,384,818; 3,535,373, 3,535,374 and 3,535,375.

Among the alkali metal salts of amino carboxylic acids the trisodium salt of nitrilo triacetic acid is of considerable interest in that it is an effective substitute for all or a major portion of phosphate-including sequestering agents in laundering compositions. The reduction or elimination of phosphates discharged into natural waters is highly regarded as an ecological necessity in the minimization of abnormal growth rates of certain phosphate loving plant life. The trisodium salt of nitrilo triacetic acid as a component in detergents is one approach to substantial reduction of possible contamination by phosphate wastes.

While prior art methods of preparing the amino carboxylic acid salts have taught the route to reasonably high production levels in a matter of ultimate yield in the reaction of alkali metal hydroxide with an amino alkanol, such relatively reasonable yields are obtained only at what can now be stated as abnormally extended reaction times as in the order of many hours to several days. It is therefore highly desirable to obtain ultimate yields of better than 80% of the desired alkali metal salt of the amino carboxylic acids at reaction times of less than two hours.

SUMMARY OF THE INVENTION

It has now been found that a substantially improved time-yield factor (high yield at short reaction time) is obtained in the preparation of the alkali metal salt of amino carboxylic acids derived from amino alkanols by operation which includes the liquid phase dehydrogenation of amino alkanol with a stoichiometric excess of alkali metal hydroxide in the presence of at least enough water to insure solution of reactants at the prevailing reaction conditions, and in the presence of a dehydrogenation reaction promotion agent, by control of the reaction conditions such that the hydrogen partial pressure in the vapor phase in the reaction zone is less than 50% of the total vapor pressure.

The reaction and charge conditions include a liquid phase operation in which the water in the system is above 25% by weight of the total charge and preferably is in the range of 30% to 70% by weight of the total weight of the charge to the reaction zone. The amount of sodium hydroxide on the basis of the initial amount of the amino alkanol in the charge must be in excess of the stoichiometric minimum and is generally in the range of 1.25 to 3 moles per equivalent of amino alkanol. The oxidation reaction promotion agent may be any metal of Group II-B and Group VIII of the Periodic System and preferably is a cadmium moiety which is referred to henceforth herein as a cadmium catalyst and is present in an amount based on cadmium as metal in the range of 0.2 to 20 gm. atoms of cadmium per 100 moles of amino alkanol in the charge; with the preferred range in the order of 1 to 10 gm. atoms of cadmium per 100 moles of amino alkanol.

With such a charge the reaction is effected in the liquid phase, loss of water is held to a minimum or negligible extent and reaction temperatures are in the range of 390° F. to 550° F. and preferably in the range of 425° F. to 500° F. In order to meet the requirements of a partial pressure of hydrogen of less than 50% of the total vapor pressure in the reaction zone the pressure conditions in accordance with the operating temperature range are in the order of 125 to 150 p.s.i.g. (pounds per square inch gauge) at the lower temperature range to 525 to 1750 p.s.i.g. at 550° F.; preferably the temperature range is 425° F. to 500° F. requiring pressures ranging in the order of 250 to 300 p.s.i.g. at the lower temperature to 475 to 660 p.s.i.g. at the higher temperature. When all of these several variations of operating conditions are adhered to, the reaction proceeds to at least 80% of the ultimate yield in two hours or less.

It is, therefore, an object of the present invention to provide an improved method for the production of alkali metal salts of amino carboxylic acids derived from amino alkanols. It is a further object to provide a method for obtaining increased yields at shorter reaction times. Other objects and advantages will be apparent from the several examples and detailed information presented hereinafter.

DETAILED DESCRIPTION

While the invention as contemplated applies to the alkali metal salts of the amino carboxylic acids derived from amino alkanols, the description and details of operation, for the sake of simplicity, will be directed to the trisodium salt of nitrilo triacetic acid.

The dehydrogenation reaction of nitrilotriethanol with at least a stoichiometric amount of sodium hydroxide progresses through three steps to the desired trisodium salt, namely, first, a monosodium salt (sodium N,N-bis-hydroxyethylglycinate), second, a disodium salt (disodium N-hydroxyethyliminodiacetate) and finally, the trisodium salt which is the desired product. In each step there is a mole of sodium replacement for 2 moles of hydrogen; likewise, each step is exothermic at elevated pressures. Thus the reaction has a tendency toward runaway elevated temperatures as well as a simultaneous release of sizable quantities of hydrogen. Previously temperature control has been effected by control of the reaction rate, e.g., the slower the reaction, the more easily exothermic heat removal is effected, and operation at relatively high pressures, e.g., 500–2500 p.s.i.g. (pounds per square inch gauge) in a closed system. In general the reaction tends to go more rapidly as the temperature increases but product degradation and other detrimental effects occur more and more readily as temperature increases above about 500° F. and seriously above about 550° F.

The prior art does not lead one to the belief that, pressure is a significant reaction parameter. However, we have discovered that the hydrogen pressure has marked effects upon the rate of reaction and in certain circumstances upon the yield of the desired product. Thus, high pressures, e.g. over 2500 p.s.i., serve to prevent or stop the cadmium catalyzed dehydrogenation of triethanolamine with sodium hydroxide. However, at lower pressure the rate of reaction can be observed to increase surprisingly and particularly as the hydrogen partial pressure in the reaction system is reduced to as near zero as practicable.

In order to obtain the best utilization of equipment and to produce NTA at the least cost, the highest rate of reaction consistent with desired selectivity must be attained. This end can be achieved, according to our invention, by removing the hydrogen from the reaction site as fast as it is formed and by keeping the hydrogen partial pressure over the reaction mixture as near zero as possible. One means of doing so is to conduct the reaction under reflux conditions so that the formed hydrogen is rapidly swept up and away with the rising solvent, e.g. water, vapors. The water is condensed and returned to the reaction system to maintain the water concentration at at least the described minimum and the hydrogen is bled from the system by appropriate throttling.

The conditions of reflux should be such that excessive loss of water is prevented. The equilibrium reaction of metal hydroxides with amino alcohols to form metal alkoxides and water is well known. If water is permitted to escape from the reacting system, as was intentionally practiced in U.S. 3,535,373; 3,535,374 and 3,535,375, this equilibrium reaction is drawn to completion, and the elements required for the desired reaction are no longer present within the system. That is to say, a participant in the reaction has escaped, and essential stoichiometry no longer exists. Periodic replacement of water permits the resumption of reaction but at considerable expense in elapsed time. Thus the total pressure of the reacting system must be chosen so that at the desired temperature of reaction the water content of the reaction mass is no less than one mole for each mole of hydroxyethyl group to be converted. In general such pressures will be greater than 125 p.s.i.g.

On the other hand, hydrogen pressure can be most advantageously employed to control or moderate the rate of reaction, as in the initial stages of a large batch process or during the startup phase of a continuous process. Thus the initially very high reaction rate potential can be moderated by higher hydrogen partial pressure thereby moderating the tendency toward violent temperature surge. The heat of reaction can then be effectively dissipated during the first portion of the reaction without the necessity of providing extensive and later unneeded means to prevent runaway temperature increase from the too rapid action.

An additional advantage of operating the process at low hydrogen pressure relates to efficient use of cadmium catalyst. We have found that an effective catalyst appears to be a soluble complex of cadmium (II). The redox potential of the cadmium (II)-cadmium (O) pair in the operable range of temperature is such that relatively low pressures of hydrogen suffice to reduce cadmium (II) to the metal. Thus within the range of practical operating conditions hydrogen partial pressures of above about 50% of the total vapor pressure in the zone of reaction tend to cause all or part of the cadmium catalyst moiety to be reduced to the metallic state which is in itself catalytically ineffective. Also, in a continuous process cadmium metal would tend to accumulate in the reactor. While cadmium metal has solubility in alkaline media, too high hydrogen partial pressure provides sufficient driving force such that the metallic state is the equilibrium state, thus making it ineffective as a promotion agent and increasing the deposit-accumulation possibility. However, when the hydrogen partial pressure is less than about 50% of the total vapor pressure the equilibrium changes such that the metallic form can complex, the complex can dissolve in the alkaline media and can function in the reaction.

The exact mechanism by which cadmium exerts its promotional activity in this reaction is not known with complete certainty. It is apparent that in the nitrilotriethanol-caustic-water system a soluble complex with divalent cadmium forms. It is postulated that in the performance of its promotional function the divalent cadmium is reduced to a lower valence state and a carboxylate group is generated. The lower valent cadmium is immediately reoxidized by water, with attendant liberation of hydrogen, and is available to re-complex which now includes complexing with the several carboxylate-containing products. The complex with nitrilotriacetic acid and sodium predominates as the reaction nears completion because of the mass action effect. While such theory seem plausible, it is to be understood that it is offered as a possible explanation and not as a controlling factor. The cadmium-NTA-Na complex is somewhat soluble in the $NTA(Na)_3$ product-water solution at reaction conditions but at normal ambient temperature conditions is substantially insoluble and is thus readily physically separable from the product as by simple filtration, centrifugation, or the like.

Such recovered cadmium-NTA-Na complex has the further important feature of being returnable to the reaction system where it not only dissolves in the nitrilotriethanol-aqueous caustic medium but promptly reforms the original cadmium (II) complex with its apparently fully restored promotional effectiveness for the conversion of the nitrilotriethanol-aqueous caustic to $NTA(Na)_3$.

The following examples are illustrative of various aspects of the improvements possible through practice of the invention. It is to be understood that the examples are not intended to be limiting and are illustrative of type rather than scope.

EXAMPLE I

In an embodiment of batch type operation a 1 gallon autoclave was charged with 300 gm. nitrilotriethanol, 300 gm. sodium hydroxide (24% excess), 550 gm. water and 15 gm. cadmium oxide. The closed autoclave was vented through a water cooled condenser connected to a proportional pressure controller set at 500 p.s.i.g. and thence to a wet test meter. The autoclave was heated as rapidly as possible to a maximum temperature of 460° F. From the time at which the first release of gas occurred, i.e., the moment when the total pressure reached 500 p.s.i.g., until 9.4 s.c.f. of gas (99% of theory) had been evolved 80 minutes elapsed. After cooling to room temperature, additional water was added to give a total weight of 1500 gm., and the insoluble complex of Cd-NTANa was filtered off (dried weight of 32 gm.). After removal of residual cadmium by precipitation as the sulfide and filtration, the filtrate was analyzed by NMR spectroscopy using sodium acetate as an internal standard. The spectrum showed a conversion of 97% of hydroxyethyl groups to carboxymethyl groups, a better than 90% recovery of charge and a 90% yield of $NTA(Na)_3$ (not including that removed with the catalyst).

EXAMPLE II

The adverse effect of high hydrogen pressures is illustrated by the following. A 300 cc. autoclave was charged in each run with 0.5 g. cadmium oxide and 10 gm. each of nitrilotriethanol sodium hydroxide and water. The autoclave was pressurized with hydrogen to the pressure shown and then sealed. It was heated with the control set at 400° F. until no further increase in pressure was observed. Exotherms occurred in Runs A and B, and the temperature rose temporarily above 400° F. The products were analyzed by dissolving in water, filtering and then determining the NMR spectrum.

| Run | $H_2$ charge, p.s.i.g. | Final pressure, p.s.i.g. | Final $P_{H_2}$, p.s.i.g. | Percent NTE converted | Time, hours | Product composition | | |
|---|---|---|---|---|---|---|---|---|
| | | | | | | Percent mono [1] | Percent di [2] | Percent NTA [3] |
| A | | 1,200 | 1,000 | 100 | >8 | | | 95 |
| B | 500 | 1,900 | 1,700 | 100 | >8 | 8 | 42 | 50 |
| C | 1,000 | 2,300 | 2,100 | 100 | >8 | 76 | 16 | 8 |
| D | 1,500 | 2,700 | 2,500 | 46 | >8 | 100 | | |

[1] Percent mono is percent bis-hydroxyethylglycine as sodium salt.
[2] Percent di is percent hydroxyethyliminodiacetic acid as disodium salt.
[3] Percent NTA is percent nitrilotriacetic acid as trisodium salt.

In comparison, operation in accordance with this invention with the same type of run using similar charge materials and in the sealed autoclave heated at 400° F. but modified in the seal by inclusion of a reflux condenser, pressure control valve and wet test meter on the line from the pressure control valve shows:

| Run | $H_2$ charge, p.s.i.g. | Final pressure, p.s.i.g. | Final $P_{H_2}$, p.s.i.g. | Percent NTE converted | Time, hours | Product composition | | |
|---|---|---|---|---|---|---|---|---|
| | | | | | | Percent mono [1] | Percent di [2] | Percent NTA [3] |
| E | | 200 | ~10 | 100 | 1.8 | | | 95 |
| F | 200 | 200 | ~10 | 100 | 1.9 | | | 92 |

[1] Percent mono is percent bis-hydroxyethylglycine as sodium salt.
[2] Percent di is percent hydroxyethyliminodiacetic acid as disodium salt.
[3] Percent NTA is percent nitrilotriacetic acid as trisodium salt.

EXAMPLE III

Feed stocks for a system designed for continuous operation at 390° F. and for continuous removal of hydrogen under controlled pressure conditions were prepared in the ratio of 3 moles of sodium hydroxide and 20 to 50 moles of water to 1 mole of nitrilotriethanol. Cadmium was added as the oxide in an amount equivalent to 0.05 mole per mole of nitrilotriethanol. The normally insoluble orange-red solid cadmium oxide quickly dissolved to yield a colorless solution. In order to more clearly distinguish the effect of the hydrogen partial pressure the residence time in the reaction zone was approximately 5 minutes.

The general progress of the reaction and the rates of the individual reactions could be followed by monitoring the consumption of sodium hydroxide as measured in the recovered effluents.

The effect of hydrogen pressure upon the rate of reaction can be seen from the following data obtained at 390° F.

| | Pressure,[1] p.s.i.g. | $H_2$ p.s.i. partial pressure | $P_{H_2}$, percent of total vapor pressure | Percent conversion [2] | Relative reaction rate |
|---|---|---|---|---|---|
| Run: | | | | | |
| F | 200 | 10 | 5 | 11.4 | 1 |
| G | 260 | 60 | 23 | 8.2 | 0.7 |
| H | 360 | 160 | 44 | 3.5 | 0.3 |

[1] Total vapor pressure of the reacting system.
[2] Defined as the percent of sodium hydroxide consumed.

Flow rates and concentrations were held constant. These data clearly show the benefit of operating at low hydrogen partial pressure and in conjunction with related observations establish the desirability of operating at hydrogen partial pressure of less than 50% of the total vapor pressure.

The catalysts suitable for this reaction are not limited for initial introduction to the system to the described cadmium (II) complex but include cadmium in metallic form or as suitable salts or complexes at least partially and sufficiently soluble in the triethanolamine-caustic system to provide an effective amount of the described cadmium (II) complex. Other metal moieties showing desirable catalytic attributes although not necessarily of equal effectiveness, include nickel, palladium and zinc. While sodium hydroxide is by far the most desirable alkali metal salt, other alkali and earth metals, as the hydroxides, may be employed such as lithium hydroxide, calcium hydroxide, barium hydroxide and potassium hydroxide. Other tests have shown that reaction times, e.g., holding times in the reaction zone, in the order of 10 minutes to 10 hours are effective but that the best results are obtained at holding times within the order of less than 2 hours. Preferably the holding time is no greater than 30 minutes.

EXAMPLE IV

A one gallon autoclave lined with copper was charged with 300 g. nitrilotriethanol, 300 g. sodium hydroxide, 425 g. water and 39 g. crude cadmium NTA(Na) complex recovered from a previous run. After the autoclave was pressurized to 400 p.s.i.g. with hydrogen and brought to reaction temperature the pressure was maintained at 400 p.s.i.g. by means of a proportional pressure controller. The hydrogen evolved through the controller and was passed into a wet test meter. The reaction mixture was heated to 425° F. for 7 hours. A total of 8.8 s.c.f. of hydrogen (93% of theory) was measured. After cooling, 857 g. of water was added and the mixture was filtered. The precipitated catalyst weighed 31.5 g. The filtrate was treated with sodium sulfide to precipitate residual traces of cadmium and then analyzed for NTA $(Na)_3$. The final product was 75% of $NTA(Na)_3$ plus 25% of IDA (the sodium salt of iminodiacetic acid). Thus, operation outside the prescribed conditions while showing good conversion albeit at extended time results in an unsatisfactory product composition.

That the reaction time can be minimized by operating at temperatures above about 425° F. and at relatively low water content was shown by similar runs reported in the table below. The total pressure was 400 p.s.i.g. in all runs.

| | Water charged,[a] g. | Reaction temp., °F. | Percent yield | | G. CdO[a] | Time, hours |
|---|---|---|---|---|---|---|
| | | | $NTA(Na)_3$[b] | $IDA(Na)_2$[b] | | |
| Run: | | | | | | |
| A | 600 | 400 | 73.6 | 26.4 | 7.5 | 20 |
| B | 375 | 450 | 87.9 | 12.1 | 5.0 | <2 |
| C | 375 | 452 | 89.8 | 10.2 | 8.5 | <2 |

[a] Per 300 g. nitrilotriethanol.
[b] Yields are based on nitrilotriethanol charged.

In several runs in which the initial charge to the reaction zone was composed of 1 part by weight of nitrilotriethanol, 3 parts by weight of NaOH and 3 parts by weight water, as well as an appropriate amount of cadmium-promoter the total vapor pressure during the reaction at a temperature of 500° F. is maintained at 475 p.s.i.g. by nonselective-control venting of the vapor. The resultant loss of water from the system results in the formation of nonfluid cake in the reactor. Upon removal and analysis of the cake the yield of the trisodium salt of nitrilotriacetic acid is far from satisfactory; also after the water originally present in the reaction zone is gone there is no further observable conversion to desired product, regardless of time, temperature and pressure adjustments. Other tests show that caking occurs, even though the desired reaction continues at least in part, when the water content of the reaction system is about 25% of the total weight of the reaction mass. It is likewise found that the most practical operation is obtained when the reaction mass retained a pumpable fluid consistency, a condition requiring the presence of water in an amount of approximately 30% by weight of the reaction mass.

In these and similar tests it has been observed that while the reaction rate increases as the temperature increases, at temperatures about 500° F. the desired reaction becomes noticeably adversely affected and that at about 550° F. and above product degradation or undesirable side reactions are so marked as to be quite undesirable.

It can be noted that operation within the defined limits, and particularly with control of the hydrogen partial pressure in the reaction zone to less than 50% of the total vapor pressure, permits the obtaining of desired product in the stated amount in less than 2 hours, such operation can be continued at similar conditions for reasonably extended time periods without materially affecting either the quantity or quality of the product.

EXAMPLES V-VIII

In runs employing aminoalcohols, including diethanol amine (V), mono- (VI) and di- (VII) propanol amines and hexaethanol triethylene tetramine (VIII), with appropriate adjustment of the amount of caustic relative to the replaceable hydrogens in the separate aminoalcohols in the respective charges, it is found that the requirements of water and hydrogen partial pressure when met likewise result in high yields at relatively shortened reaction times.

EXAMPLE IX

In a nickel-lined, 300 ml. autoclave there was charged 17.4 gm. of bishydroxyethyl piperazine, 10 gm. sodium hydroxide, 0.5 gm. cadmium oxide and 30 gm. of water. After reaction at 200 p.s.i.g. for 2 hours the product was treated and recovered as in Example 1. Analysis by NMR spectroscopy, using sodium acetate as an internal standard, showed substantially complete conversion of the bishydroxyethyl piperazine and, on the basis of the bishydroxyethyl piperazine in the charge, a yield of 96.1% of the di-sodium salt.

Obviously, many modifications and variations of the present invention as hereinbefore set forth may be made without departing from the spirit and scope thereof and therefore only such limitations should be imposed as are indicated in the appended claims.

What is claimed is:

1. In a process for the preparation of an alkali metal salt of an amino acid by reacting:

an alkali metal hydroxide, with an amino alcohol having at least one primary alcohol group, said reaction being conducted in liquid phase in an enclosed reaction zone at a temperature in the range of 390° F. to 550° F. with a reaction charge containing said amino alcohol, an amount of alkali metal hydroxide in excess of that stoichiometrically equivalent to the available primary alcohol groups of said amino alcohol, and an amount of water in the range of 30 to 70 weight percent of the total charge, and with a promotional amount of a catalytically effective metal moiety selected from the group consisting of cadmium, nickel, palladium and zinc; the improvement which comprises:

(a) removing as an overhead vapor a mixture of water and hydrogen, (b) passing said mixture into a condenser and condensing the water therein;

(c) recycling said condensed water to said reaction zone, and (d) throttling the vapor discharge from said condenser to maintain the pressure in said reaction zone at a pressure within the range of 125 p.s.i.g. to 1750 p.s.i.g. such that the hydrogen partial pressure in said reaction zone is less than 50% of the total vapor pressure in said reaction zone, whereby said alkali metal salt of said amino acid is obtained in a yield of at least 80% of theory possible on the basis of the amino alcohol originally present in said charge and at a reaction time no greater than 120 minutes.

2. The process of claim 1 wherein said catalytically effective metal moiety is cadmium and is present in said charge in an amount in the range equivalent to 0.2 to 20 gram atoms of metal per 100 moles of said amino alcohol.

3. The process of claim 1 wherein said water is present in an amount in the range of about 50% by weight of the total weight of said charge, said amount of water being substantially retained in said reaction zone during said reaction.

4. The process of claim 1 wherein said alkali metal hydroxide is sodium hydroxide and said amino alcohol is nitrilotriethanol.

5. The process of claim 4 wherein said NaOH is present in the charge in an amount in the range of 1.25 moles to 3.0 moles per equivalent of said nitrilotriethanol.

6. The process of claim 5 wherein said pressure is in the range of 125 to 150 p.s.i.g. at 390° F. to 475 to 660 p.s.i.g. at 500° F.

References Cited

UNITED STATES PATENTS

| 3,404,179 | 10/1968 | Weiss et al. | 260—531 C X |
| 3,535,373 | 10/1970 | Jackisch | 260—531 C |
| 3,535,374 | 10/1970 | Jackisch | 260—531 C |
| 3,535,375 | 10/1970 | Jackisch | 260—531 C |
| 3,578,709 | 5/1971 | Bishop et al. | 260—534 E |

LORRAINE A. WEINBERGER, Primary Examiner

R. D. KELLY, Assistant Examiner

U.S. Cl. X.R.

260—534 R, 534 E, 268 R